March 14, 1961  L. HIMMEL  2,975,418
DIRECTION FINDING SYSTEMS

Filed Dec. 1, 1948  2 Sheets-Sheet 1

INVENTOR
LEON HIMMEL
BY R. P. Morris
ATTORNEY

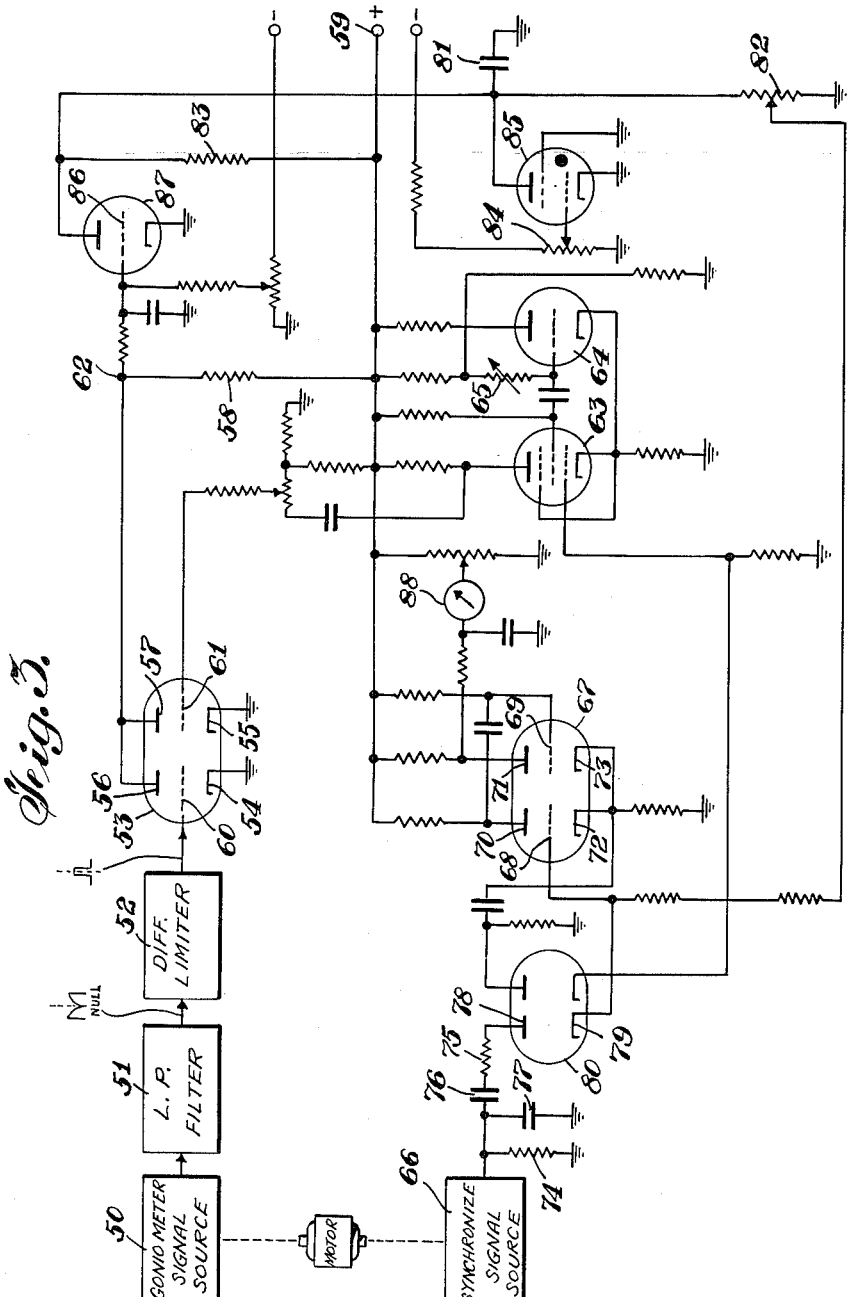

United States Patent Office 2,975,418
Patented Mar. 14, 1961

2,975,418

DIRECTION FINDING SYSTEMS

Leon Himmel, Montclair, N.J., assignor to International Telephone and Telegraph Corporation, a corporation of Maryland Filed Dec. 1, 1948, Ser. No. 62,858

23 Claims. (Cl. 343—118)

This invention relates to goniometry or direction-finding systems, and more particularly it relates to indicator arrangements for increasing the accuracy of readability of directional bearings.

In direction finders of the type wherein direction is indicated by a received pattern which is traced on the screen of an oscilloscope, it is often difficult to read the indicator accurately because of variation in the signal pattern caused by undesired modulation, atmospherics, or other disturbances. A mechanical pointer or cursor rotatable over the screen is of some help in resolving the pattern variations. However, because of its fixed dimensional characteristics, it is not always convenient to employ such a mechanical cursor and it does not cooperate to the best advantage, particularly where the indication patterns are of different shapes or amplitudes.

A principal object of the invention is to provide a bearing indication arrangement for direction finder systems, employing a signal received from a distant radiation source whose direction is to be determined, and a locally generated cursor signal.

Another object is to provide a bearing indication arrangement for direction finder systems, where the indication is in the form of a visible oscillographic trace derived from received goniometer signals, and an overlying or cursor trace derived from a local trace-producing source, whereby both traces can be simultaneously observed to increase the accuracy of readability.

Another object relates to a method of determining bearings, by simultaneously producing on the screen of a cathode-ray tube a curve or trace of known configuration whose orientation is related to the desired bearing, and another trace of the same known configuration which is produced locally and independent of the received bearing signals. The orientation of the cursor trace can be adjusted to coincide with that of the signal-produced trace, so as to increase the accuracy of readability of the bearing indication.

A feature of the invention relates to a bearing indication system employing a cathode-ray tube oscilloscope wherein the bearing pattern produced on the oscilloscope screen in response to received goniometer signals is overlayed with a similar pattern on the screen locally produced but which is independent of irregularities and omissions in the signal-produced trace.

Another feature relates to a bearing indication system employing a bearing indicator which is fed over two channels, one channel passes the received direction finder signals of known wave shape, the other channel passes locally produced signals of the same artificially-produced wave shape. By means of a novel electronic comparison and phasing circuit, the signals from the two channels are combined and compared, to produce an indication of the actual bearing, which indication is substantially free from the disturbances or low readability factors when the received signals are used by themselves to produce an indication.

A further feature relates to an improved direction finder receiving and indicating arrangement employing a cursor signal locally generated at the receiver, and novel circuit arrangements for combining the effects of the received direction finder signal and the cursor signal to increase the accuracy and ease of determination of the desired bearing.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 3 is a schematic diagram of a modification of the invention.

In direction finder systems employing a cathode ray tube oscilloscope as the indicator, there is produced on the screen of the oscilloscope a trace or indicator pattern of some known arbitrary shape, whose orientation with respect to a known point on the screen, gives the bearing of a distant radiation source.

In many cases the accuracy of readability of the pattern or trace is greatly reduced where the signal-to-noise ratio is low. In general the indicator trace should be in the form of a trace line which is as narrow and sharp as possible. Because of a low ratio of signal-to-noise, the trace becomes broad and the accuracy of the bearing reading may be worse than ±10°. Since the bearing pattern is of a known or predetermined shape, I have found that the accuracy of the readability can be greatly increased by locally generating a similar trace but which is free from noise or other disturbances, and superposing the two traces to produce the effect of visual simultaneity and coincidence. In order to effect this, the locally-controlled pattern must have the same configuration as the pattern produced by the received signals, and its orientation on the cathode ray tube screen must be capable of adjustment so that both patterns can be properly superposed. For convenience of description, the locally-generated pattern will be referred to herein as the cursor pattern, and the pattern resulting from the received signals will be referred to as the goniometer pattern. Since the two patterns are, in accordance with the invention, synchronously generated, and since the orientation of the cursor pattern can be adjusted locally by means of a dial, this dial can be calibrated to provide a direct reading of the bearing, when the two patterns are accurately superposed, I have found that the operator can superpose the cursor pattern on the goniometer pattern to a far greater accuracy than he can read the goniometer pattern by itself, since visually he can average out the noise and modulations over the entire goniometer pattern when he has a cursor pattern of ideal trace for visual comparison. In fact with one particular arrangement that was used, under conditions where it was almost impossible to read a bearing with the single conventional goniometer pattern, a bearing accuracy within ±3° was obtained when using the cursor pattern. Also in the case of weak bearing signals, the accuracy of readability with the cursor pattern was within ±1° as compared to ±3° without the cursor.

Figure 1:
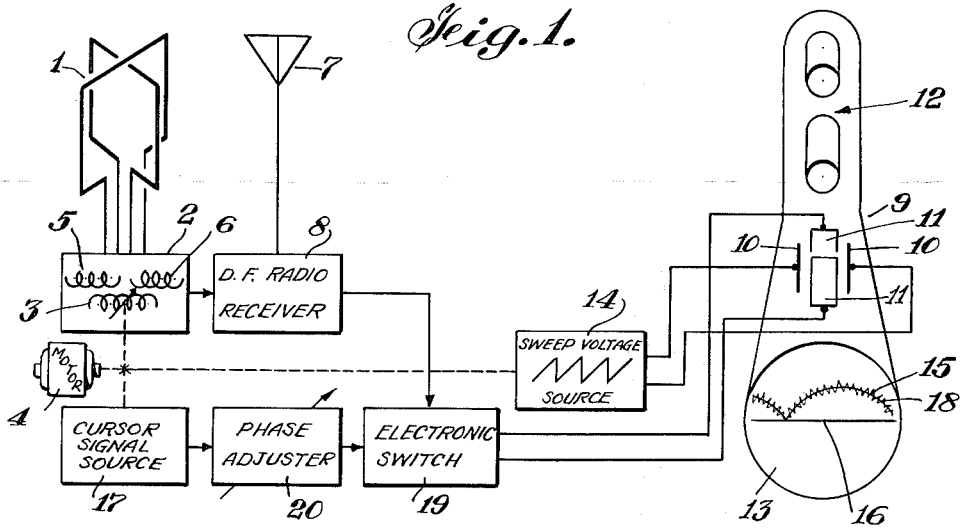
Fig. 1 is a simplified schematic diagram of a direction finder system explanatory of the fundamental principle of the invention.

Referring to Fig. 1, there is shown in generalized schematic form a typical goniometer receiving system wherein the invention is used. The directionally sensitive antenna 1 of any well-known type is connected to a suitable goniometer 2 whose search coil 3 is rotated by motor 4 in relation to the associated field windings 5, 6, to produce in the goniometer output a signal whose phase is determined by the orientation of the antenna 1 with respect to the distant radiation source whose bearing is to be determined. Preferably a non-directional antenna 7 is used in conjunction with antenna 1 to give a sense-of-direction to the resultant signal. Both antennas may be connected by any well-known radio receiver 8 such as is conventionally used in goniometer systems of the radio responsive type.

The signals from receiver 8 are then applied to a cathode-ray tube oscilloscope 9 having the usual horizontal beam deflector elements or plates 10, and the usual vertical beam deflector elements or plates 11, as well as the associated conventional electron gun 12 and fluorescent screen 13. By well-known means the electrons from the gun are focussed in a small spot on the screen 13. By appropriate application of the received goniometer signals from the receiver 8, to the plates 11, and by applying a suitable sweep voltage from source 14 to the other plates 10, there is traced on the screen 13 a pattern or trace 15 of predetermined configuration and whose maxima or minima along the base line 16 bear a direct indication of the bearing of the distant radiation source.

Also associated with the tube 9 is a local source 17 for generating the cursor signal. The source 17 may take the form of any well-known wave generator, for example an alternator which produces an output voltage of the appropriate frequency and wave shape similar to that available at the output of receiver 8 so that when it is applied to the deflector plates 11 in place of the goniometer signals from the receiver 8, it produces in conjunction with the sweep voltage applied to plates 10 from the sweep voltage source 14, the pattern as represented by the full-line trace 18. Preferably the traces 15 and 18 are produced in alternate sequence and at a sufficiently high scanning rate to produce the effect of a continuous or steady trace. In order to produce the signal pattern and the cursor pattern in alternate sequence on the screen 13, there is provided any well-known form of electronic switch 19 which alternately switches the signals from the receiver 8 and from the cursor source 17 to the deflector plates 11. In order to effect this properly, the motor 4 which rotates the goniometer rotor 3, also controls the speed of the alternator, i.e. the cursor signal source 17. The sweep source 14 as well as the electronic switch 19 are also synchronized with the motor 4 by any means well-known in the art. This synchronized relation is indicated schematically in Fig. 1 by the dot-dash connection lines between the various elements, 3, 4, 14 and 17. While Fig. 1 shows the switch 19 in generalized schematic form, it will be understood that any well-known electronic switch can be employed to switch the plates 11 from the receiver 8 to the source 17.

As pointed out above, the positioning of the pattern 15 will be dependent upon the bearing of the distant radiation source. Connected between the cursor source 17 and the switch 19 is any well-known form of phase adjuster 20, by means of which the positioning of the cursor pattern 18 can be changed until it completely overlies the goniometer pattern 15. Preferably source 17 is also adjustable in amplitude so that the pattern of the received signal may be more closely simulated.

Figure 2:
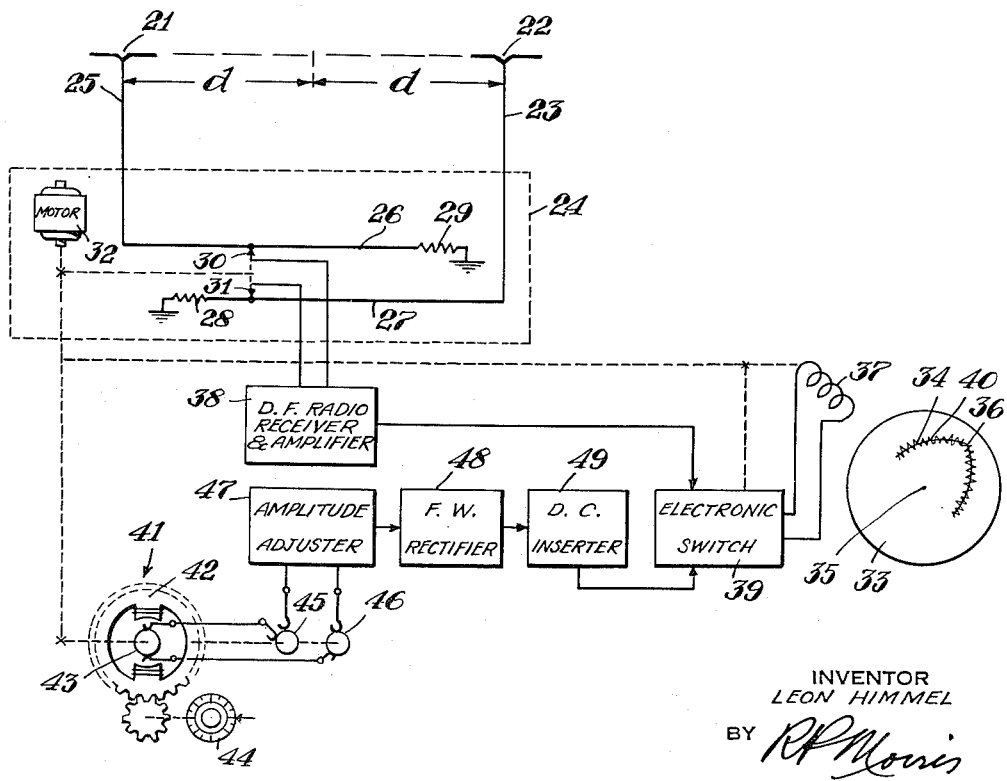
Fig. 2 is a schematic diagram to Fig. 1 showing in more detail one particular method of producing a cursor trace according to the invention.

The invention is well-suited for use in a direction finder system of the phase comparison type such as schematically illustrated in Fig. 2. In such a system a pair of antennas 21, 22 are spaced apart a known fixed distance 2d, one antenna being connected through a wave transmission line 23 to the phase shift goniometer 24, and the other antenna being likewise connected through a similar wave transmission line 25 to the same goniometer. The goniometer may comprise for example a pair of parallel transmission line sections 26, 27, each terminating in a respective grounded load resistor 28, 29. A pair of brushes 30, 31, are moved as a unit along the respective lines 26, 27, by a suitable motor 32. While the lines 26, 27, are schematically shown as straight linear conductors, it will be understood that they may be arranged in parallel or concentric circular configuration so that the brushes 30, 31, can wipe the lines in a continuous rotary motion. At some point between the ends of the lines 26 and 27, the two voltages induced in antennas 21, 22 will be in phase opposition. The position of the resulting null point determines the bearing of the distant source, and the shape of the wave pattern is independent of the bearing. However the spacing between the maxima, is a function of the input frequency of the goniometer, since it is a function of the electrical length of the goniometer transmission line per unit angle of effective rotation of the brushes 30, 31. This direction finder itself forms no part of my invention but its action has been briefly described as a part of the background to explain the application of my invention thereto.

The pattern of response with angular orientation of the goniometer may be made to appear in a given sector on the screen 33 of the cathode ray tube oscilloscope as shown by the trace 34. By means of a suitable time base or sweep voltage, this pattern can be reproduced and rotated around the point 35 so that the apex or maximum point 36 of the trace, which corresponds to the null, follows a circular path concentric with point 35. This can be accomplished by applying a full wave rectified sine wave sweep voltage derived from the receiver signals to the rotatable reflection coil 37, rotated at the same periodicity as the goniometer output waves. These voltages are applied through receiver 38 and electronic switch 39 coil 37.

In order to produce the artificial cursor pattern 40, there is provided an alternator 41 whose normally stationary field structure 42 is mounted on suitable bearings so as to be manually rotatable around the rotor 43, a suitably calibrated dial 44 being provided to indicate the orientation of the field structure around the rotor. The slip rings 45 and 46 of the alternator are connected through amplitude adjuster 47, rectifier 48, D.C. inserter 49 and coil 37 of the indicator. Preferably amplitude control 47 is provided to match the cursor trace with the goniometer trace. Thus by turning the dial 44 and adjusting the amplitude control 47 and the D.C. inserter 49, the cursor pattern 40 can be made to overlie accurately the goniometer pattern 34, with consequent ease and accuracy of readability of the bearing. Since the two patterns are matched, the bearing can be read directly from the dial 44.

Referring to Fig. 3, a description will now be given of a system which is automatic in comparing the goniometer signal with the cursor signal, and which does not depend upon the visual comparison of the two cathode-ray tube traces. Instead of matching the full-wave pattern of the goniometer signal with a similar full-wave pattern from an alternator, advantage is taken of the fact that the null point of the goniometer signal changes its phase along the time axis according to the bearing to be determined. The goniometer null signal is converted into a square-topped wave which is centered on the null point. The cursor signal is likewise produced as a similar square-topped wave which is synchronized in any suitable way with the goniometer null signal. The signal from the goniometer receiver and amplifier 50 is fed through a low-pass filter 51 to produce a desired wave shape. It is then passed through a differentiator and limiter 52 to produce the square-topped waves. It will be understood that the distance between the peaks of the goniometer wave corresponds to 180° azimuth scan of the goniometer, and by any well-known means synchronizing waves can be set up at the beginning of each such scan. It will be observed that these synchronizing waves are in timed coincidence with the beginning of each 180° scan. From the foregoing, it will be seen that the square pulse will bear a different phase relation to the synchronizing waves in accordance with the location of the null.

The output of the limiter 52 is applied to a phase comparator tube 53 which for example may comprise a dual triode whose cathodes 54, 55, are both grounded and whose anodes 56, 57 are connected together and through a common plate load resistor 58 to the positive terminal 59 of a D.C. plate power supply. The control grid 60 is driven by the signal from the limiter 52, while the control grid 61 is driven by the cursor signal as will be described. The characteristics of tube 53 are such that when either of the triode sections, or both sections, are conducting, the voltage at the point 62 is very low, e.g., about 65 volts. However, when both triode sections are simultaneously biassed to plate current cut-off, the voltage at point 62 rises substantially to the level of terminal 59, e.g., hence with the goniometer signal applied to grid 60 and with the cursor signal applied to grid 61, by varying the delay or phase of the cursor signal, and observing the voltage at point 62, coincidence of phase is represented by a sharp rise in voltage at that point.

While any well known means may be used to produce the cursor signal and to adjust its phase delay, it is preferably produced by a multi-vibrator circuit consisting of two grid-controlled tubes 63, 64, which are interconnected in the well-known manner to form a single-shot relaxation oscillator. That is, they undergo a complete cycle of operation for each triggering pulse applied thereto, and then they remain quiescent until a succeeding triggering impulse is applied. By means of the adjustable potentiometer 65, the width of the pulse can be made equal to the sweep period. Since tubes 63 and 64 form a single-shot multi-vibrator, they must be triggered, for example by the synchronizing waves generated in the goniometer 50 or in a separate device 66 running synchronously with the goniometer. Since the cursor signal is to be adjusted in phase to match any received goniometer signal, the triggering pulse for the multi-vibrator 63, 64, must likewise be delayed. This delay can be achieved in any well-known adjustable phase delay device, preferably by another delay multi-vibrator 67 comprising for example a dual triode having the grids 68, 69 and the plates 70, 71 interconnected in the well-known manner to act as a single-shot multi-vibrator. The cathodes 72, 73 are connected together and returned to ground through a resistor and the multi-vibrator 67 is triggered by the synchronizing signal. However, this signal is first differentiated by means of the network comprising resistors 74, 75 and condensers 76, 77 and the differentiated pulse is peaked and clipped by the first section 78, 79, of a dual diode 80. The pulse width of the multi-vibrator 67, is a function of the operating bias on the grid 68. This bias is obtained from a sweep condenser 81 and a level adjusting potentiometer 82. The condenser 81 is charged from the terminal 59 through a resistor 83, and as it charges, the negative bias on grid 68 increases and thus delays correspondingly the triggering of the multi-vibrator 67. When condenser 81 has become charged to a level determined by the setting of potentiometer 84, the grid-controlled gas tube or thyratron 85 becomes conductive and discharges the condenser 81 to start the sweep action again. If during this sweep cycle the cursor pulse coincides with the goniometer pulse a sharp positive pulse is generated by the action of tube 53 as above described. This positive pulse is applied to the control grid 86 of a tube 87, which is normally biassed so as to be very lightly conductive. However, when the above-mentioned positive pulse is applied from point 62, tube 87 begins to conduct heavily, thereby preventing sweep condenser 81 from charging to a higher level.

Summarizing the foregoing action, the cursor pulse is swept continuously and repeatedly along the azimuth ordinate. When there is no received goniometer signal, the sweeping action is cyclical. When a goniometer signal is received and appears at some point at the azimuth ordinate, the cursor pulse sweeps until it is coincident with the goniometer pulse at which point it locks in. A suitable calibrated meter 88 is connected to the multivibrator 64 which shows a reading proportional to the delay produced in the multi-vibrator as above described, and the readings on meter 88 can therefore be calibrated directly in degrees of azimuth. The bearing can therefore be read directly from meter 88 and no other indicating device is necessary.

While I have described above the principles of my invention in connection with specific apparatus, it is to be clearly understood that this description is made only by way of example and not as a limitation to the scope of my invention.

What is claimed is:

1. A direction finding arrangement, comprising, a cathode-ray tube oscilloscope, means to produce oscilloscope deflection signals at a given rate in response to radiations from a distance source whose orientation is to be determined, a source local to said direction finding arrangement for producing a cursor signal having a wave configuration substantially similar to the wave formation of said deflection signals, means synchronizing said local source of cursor signals to said given rate of deflection signals, means to produce other oscilloscope deflection signals at said given rate under control of the cursor signals of said local source and independent of said distant source, said oscilloscope having coordinate beam deflecting units, means to apply to one of the deflecting units a local sweep voltage at said given rate, and means to apply the first-mentioned deflection signals and the second-mentioned deflection signals alternately to the other deflecting unit and in timed relation respectively to said rising and falling wave portions of the local sweep voltage.

2. A direction finding arrangement, comprising, a cathode-ray tube oscilloscope, means to cyclically produce two sets of oscilloscope deflection signals, one set under control of a distant source whose orientation is to be determined, the other set under control of a local generator synchronized to the signals of said distant source and independent of said distant source, a saw-toothed sweep signal source synchronized with said first mentioned means for controlling the forward and reverse traces of the oscilloscope beam, means for alternately applying the said two sets of deflection signals to the same deflecting unit of said oscilloscope, and means to adjust the phase of the other set of oscilloscope deflection signals to phase coincidence with the first set of oscilloscope deflection signals and thereby to increase the readability of the oscilloscope trace produced by the first set of oscilloscope deflection signals.

3. A direction finding arrangement, comprising, a cathode-ray tube oscilloscope, a direction finding receiver for producing oscilloscope beam deflection signals of predetermined wave configuration at a given rate, a local source of cursor signals having the same wave configuration and rate as said first mentioned signal, said oscilloscope having coordinate beam deflecting elements, a source of local sweep voltage synchronized at said given rate means to energize one of said elements with said local sweep voltage, and an electronic switch arrangement for energizing the other deflecting elements alternately by the first and second-mentioned beam deflection signals to produce similar superposed visible traces.

4. A direction finding arrangement according to claim 3 in which means are provided for adjusting the phase of the cursor signals to bring them into phase coincidence with the signals from said receiver.

5. A direction finding arrangement according to claim 11 in which said receiver produces deflection signals having the configuration substantially of a full-wave rectified alternating current wave.

6. A direction finding arrangement according to claim 3 in which said receiver includes a goniometer for producing goniometer signals substantially similar in configuration to a full-wave rectified alternating current, and said local source of cursor signals comprises an alternator and a full-wave rectifier for the alternator output.

7. A direction finding arrangement according to claim 3, in which said receiver includes a goniometer for producing goniometer signals substantially similar in configuration to a full-wave rectified alternating current, said local source of cursor signals comprising an alternator and a full-wave rectifier, and means for synchronizing the rotation of said alternator with the scanning cycle of said goniometer.

8. A direction finding arrangement, comprising, a pair of direction finder antennas spaced apart a predetermined distance, a goniometer connected symmetrically to both antennas, control means to scan said goniometer to produce a goniometer signal of predetermined wave configuration, in response to radiation from a remote source, the phase of a selected point of which varies with the azimuthal direction of a distant radiation source, a cathode-ray tube oscilloscope bearing indicator, said oscilloscope having two coordinate beam deflector elements, a source of saw-tooth sweep voltage synchronized with said control means, means to apply said saw-tooth sweep voltage to one of said deflector elements, means effective during one-half of each saw-tooth cycle to apply the goniometer signals to the other deflector element, a local source of full wave rectified alternating voltage, and means to apply the rectified voltage to said other deflector element during the remaining half of each saw-tooth wave, and means to adjust the phase of the rectified voltage with respect to the goniometer signal to produce on the screen of said oscilloscope two similar superposed bearing traces for the purpose set forth.

9. In a direction finding arrangement of the type comprising a source of goniometer signal of predetermined wave shape controlled by the scanning cycle of the goniometer with respect to a distant radiation source whose orientation is to be determined, means to produce a synchronizing signal at the beginning of each goniometer scan, a local source of cursor signal of substantially the same wave shape as said goniometer signal, means to trigger said local source under control of said synchronizing signal, means to adjust the phase of said cursor signal to bring it into phase coincidence with the goniometer signal, a phase comparator for comparing the phases of the two signals, and an indicator device for producing an indication corresponding to the amount of said phase adjustment and thereby indicating the orientation of said distant source.

10. In a direction finding arrangement of the type comprising a source of goniometer signal of predetermined wave shape controlled by the scanning cycle of the goniometer with respect to a distant radiation source whose orientation is to be determined and wherein said goniometer signal has a null point whose phase corresponds to the said orientation, means to produce a cursor signal wave in synchronism with the goniometer scan, a phase comparator for the goniometer and cursor signals, means for shifting the phase of the cursor signal, and means controlled by the output of said phase comparator for automatically adjusting said phase shift and thereby producing an indication representing the orientation of said distant source.

11. A direction finding arrangement according to claim 10, in which the means to produce the cursor signal includes a multi-vibrator which is triggered by said synchronizing signal.

12. A direction finding arrangement according to claim 10 in which the means to produce the cursor signal includes a first single-shot relaxation oscillator, a second single-shot relaxation oscillator for controlling the first oscillator, and means to trigger the second oscillator by said synchronizing signal.

13. A direction finding arrangement according to claim 10 in which the means to produce the cursor signal includes a single-shot multi-vibrator, means to trigger said multi-vibrator under control of said synchronizing signal, and means to delay said triggering under control of the output of said phase comparator.

14. A direction finding arrangement according to claim 10, in which the means for producing the cursor signal includes a single-shot multi-vibrator, means to trigger said multi-vibrator under control of said synchronizing signal, another multi-vibrator for controlling the triggering of the first multi-vibrator, a source of sweep voltage controlled by the output of said phase comparator, and means to apply said sweep voltage to the second multi-vibrator to correspondingly delay the triggering of the second multi-vibrator with relation to said synchronizing signal, and an indicator device controlled by said triggering delay and thereby indicating the said orientation of the distant source.

15. A direction finding arrangement, comprising, a scanning goniometer for producing a goniometer signal having a null coresponding to the orientation of a distant radiation source, means to produce a square-topped wave in timed coincidence with said null, a phase comparator upon which said square-topped wave is impressed, means to produce another square-topped signal whose timing is synchronized with the goniometer scan, means to apply said other square-topped signal to said phase comparator, means controlled by the resultant output of said comparator for automatically adjusting the phase of said other square-topped signal with relation to said goniometer scan, and an indicating device for indicating the amount of said phase adjustment and thereby indicating the orientation of a distant radiation source acting on said goniometer.

16. A direction finding arrangement according to claim 15 in which said phase comparator comprises a dual grid-controlled tube for producing a control signal when said two square-topped signals are applied to the dual grids in phase coincidence, and the means for automatically adjusting said phase of said other square-topped wave comprises a sweep control voltage whose cyclical duration is controlled by the phase relation between said control signal and said first mentioned square-topped wave.

17. A direction finding arrangement according to claim 15 in which said phase adjusting means includes a multi-vibrator of the grid-controlled electron tube type, a sweep control circuit, means for applying a triggering bias to said multi-vibrator tube under joint control of said first mentioned square-topped wave and said sweep circuit voltage, a second multi-vibrator to said phase comparator, and means to terminate said sweep control voltage when the two signals applied to said phase comparator are in phase coincidence.

18. A direction finding arrangement comprising a direction finder receiver for producing a signal of a predetermined wave configuration in response to radiations from a distant source, whose orientation is to be determined, a source local to said receiver for producing another signal whose wave configuration is substantially the same as the wave configuration of the first mentioned signal, the phase shift of the wave configuration of the received signal with respect to the local signal being in accordance with the bearing of said distant signal source and means to vary the phase of said locally produced signal for superposing said signals in like phase to produce an easily readable resultant bearing indication.

19. A direction finding arrangement according to claim 18 wherein last mentioned means includes means for producing a bearing indication when signals are in like phase.

20. A direction finding arrangement for radiations received from a distant source, comprising a goniometer for producing a signal of a predetermined wave configuration whose phase is related to the orientation of the source of the said received radiations, means to produce a visible bearing trace corresponding to said goniometer signal, a source local to said receiver for producing a cursor signal having a wave configuration substantially similar to said goniometer signal but independent of said goniometer signal, and means to vary phase of said cursor signal with respect to said goniometer signal to produce superposed visible traces under control of the goniometer signal and the cursor signal whereby said cursor trace, being free of noise distortion, will clearly indicate bearing of the distant source of radiation.

21. A direction finding arrangement comprising, a phase comparator device, means responsive to radiations from a distant source to produce goniometer signals of a predetermined wave configuration, a local source of cursor signals of substantially the same wave shape as the goniometer signals, means to apply both signals to said phase comparator device, means to vary the phase of the cursor signals to bring them into like phase with the goniometer signals and means for indicating the amount of said phase adjustment, thereby indicating the bearing of the distant source of radiations producing the said goniometer signals.

22. A device for determining at a receiving point the orientation of a distant source of signal radiation having a given wave configuration and occurring at a given rate comprising means to detect the signals of said distant source, means to locally produce a cursor signal of substantially the same wave configuration as said detected signal and at said given rate, means to adjust the phase of said locally produced cursor signal with respect to said detected signal, means to superpose both of said signals in a common phase comparison device, and means to adjust the phase of said cursor signal to coincide with the phase of said detected signal whereby a visual directional indication of the source of radiation of said detected signals is produced.

23. A device for determining the bearing of a distant source of radio frequency radiations from a receiving point comprising means for translating the detected radiations at said receiving point into an electrical signal having a predetermined wave configuration and a phase corresponding to said bearing, means to translate said electrical signal into a corresponding visual trace, means to locally produce a cursor signal of substantially the same wave configuration as said electrical signal but independent of said radiation, means to translate said locally produced signal into a corresponding visual cursor trace, means to adjust the phase of said locally produced signal to superpose both of said traces whereby a more accurate reading of the said first-mentioned trace by use of said second-mentioned trace is obtainable.

References Cited in the file of this patent

UNITED STATES PATENTS

| | | |
|---|---|---|
| 2,263,377 | Busignies et al. | Nov. 18, 1941 |
| 2,407,281 | Johnson et al. | Sept. 10, 1946 |
| 2,418,143 | Stodola | Apr. 1, 1947 |
| 2,464,258 | Prichard | Mar. 15, 1949 |
| 2,510,074 | Cleaver | June 6, 1950 |